United States Patent [19]

Kretow et al.

[11] Patent Number: 4,803,105
[45] Date of Patent: Feb. 7, 1989

[54] REINFORCING SHEET FOR THE REINFORCEMENT OF PANEL AND METHOD OF REINFORCING PANEL

[75] Inventors: Robert P. Kretow, Howell; John W. Powers, Old Bridge, both of N.J.

[73] Assignee: Essex Specialty Products, Inc., Clifton, N.J.

[21] Appl. No.: 14,636

[22] Filed: Feb. 13, 1987

[51] Int. Cl.⁴ ............................................. A61F 13/02
[52] U.S. Cl. ..................................... 428/40; 428/261; 428/290; 428/251; 428/344; 428/413; 428/414; 428/415; 428/416; 428/417; 428/418
[58] Field of Search ................. 428/414, 418, 416, 40, 428/251, 344, 458, 413, 343, 273, 261, 290

[56] References Cited

U.S. PATENT DOCUMENTS

| | | | |
|---|---|---|---|
| 3,529,693 | 9/1970 | Woodward et al. | 428/116 |
| 3,553,054 | 1/1971 | Maus | 428/116 |
| 3,695,968 | 10/1972 | Morrison | 428/116 |
| 3,817,808 | 6/1974 | Ronan et al. | 428/116 |
| 3,895,152 | 7/1975 | Carlson et al. | 428/116 |
| 4,180,608 | 12/1979 | Del | 428/416 |
| 4,369,608 | 1/1983 | Miura | 52/389.9 |
| 4,374,890 | 2/1983 | Shimizu | 428/212 |
| 4,378,394 | 3/1983 | Miura | 428/113 |
| 4,378,395 | 3/1983 | Asoshima | 428/158 |
| 4,397,914 | 8/1983 | Miura | 428/43 |
| 4,399,174 | 8/1983 | Tanaka | 428/67 |
| 4,444,818 | 4/1984 | Tominaga | 428/36 |
| 4,451,518 | 5/1984 | Miura | 428/137 |
| 4,500,589 | 2/1985 | Schijve et al. | 428/416 |
| 4,501,787 | 2/1985 | Marchett et al. | 428/416 |
| 4,511,621 | 4/1985 | Thomas et al. | 428/343 |
| 4,559,252 | 12/1985 | Motoda | 428/57 |
| 4,569,880 | 2/1986 | Nishiyama | 428/212 |
| 4,581,267 | 4/1986 | Miller | 428/343 |
| 4,670,339 | 6/1987 | Fry | 428/416 |
| 4,707,397 | 11/1987 | Morimura et al. | 428/416 |

FOREIGN PATENT DOCUMENTS

| | | |
|---|---|---|
| 3039895 | 10/1980 | Fed. Rep. of Germany . |
| 3117604 | 1/1983 | Fed. Rep. of Germany . |
| 55-101659 | 7/1980 | Japan . |
| 56-136869 | 10/1981 | Japan . |
| 57-20358 | 1/1982 | Japan . |
| 57-151422 | 9/1982 | Japan . |
| 57-151342 | 9/1982 | Japan . |
| 58-118878 | 7/1983 | Japan . |
| 58-112534 | 8/1983 | Japan . |
| 58-136435 | 8/1983 | Japan . |

*Primary Examiner*—Edith Buffalow
*Attorney, Agent, or Firm*—Curtis, Morris & Safford

[57] ABSTRACT

A reinforcing sheet adaptable to the reinforcement of a panel formed of metal, plastic or sheet molding compound, which reinforcing sheet contains a moisture impermeable barrier embedded in a thermosetting adhesive layer and a reinforcement adhered to the surface of the adhesive layer opposite the surface to be applied to the panel to be reinforced. The reinforcing sheet with improved resistance to the adverse effects of moisture is advantageously used to reinforce cold rolled steel, such as an automobile panel.

19 Claims, 1 Drawing Sheet

REINFORCING SHEET FOR THE REINFORCEMENT OF PANEL AND METHOD OF REINFORCING PANEL

FIELD OF THE INVENTION

The present invention relates to a reinforcing sheet for the reinforcement of a panel formed of metal, plastic or sheet molding compound and to a method for reinforcing a panel formed of metal, plastic or sheet molding compound with the reinforcing sheet.

More specifically, this invention relates to a reinforcing sheet with improved resistance to the adverse effects of moisture and to a method for reinforcing a cold rolled steel panel, such as an automobile panel, using such a reinforcing sheet.

BACKGROUND OF THE INVENTION

From the standpoint of resource and energy savings, for example in the automotive industry, it is desirable to reduce vehicle body weight. However, attempts to reduce weight by reducing the thickness of materials result in deterioration in strength. For example, in the case of quarter panels for automobiles, such attempts have created problems such as low strength at various points (particularly flexural strength). Insufficiently rigid outer panels cause buckling and bending with minimum applied stress.

In order to solve such problems, it is necessary to develop a suitable way to reinforce such structures. Reinforcement with a heavy metal panel is contradictory to the purpose of vehicle weight reduction. Hence, it has been proposed to reinforce the outer panels entirely or partly with lightweight resin materials.

Reinforcement comprised of thermosetting adhesive layers and a reinforcing material has been applied to steel panels for use in the production of the body of automobiles. Such reinforcement provides increased strength against force applied to the outside surfaces of the automobile body. Such reinforcement further serves to decrease vibration and corrosion of the metal panels.

For example, U.S. Pat. No. 4,369,608 describes a door for an automobile wherein a main reinforcing member made of a thermosetting resin is bonded to the inner side of an outer metal panel of the door to improve the strength and rigidity of the door. A multilayer sheet-like auxiliary reinforcing member, preferably made of a glass fabric, is bonded to the main reinforcing member. A wave-like or bead-like projection is provided on the main reinforcing member, which projection functions as a rib of the metal panel to be reinforced and serves to increase the reinforcement effects of the reinforcing sheet.

Typically, the reinforcing sheet is adhered under pressure, for example to the back surface of the metal panel to be reinforced, and thereafter cured by usual heating methods, e.g. in a hot air circulation type heating furnace, an infrared ray heating furnace or a radio frequency induction heating furnace. This heat curing treatment can be carried out simultaneously at a stage in a vehicle assembly line at which painted metal panels, having a reinforcing sheet thereon, are baked to cure the paint.

The reinforcing sheet may be premolded to conform its shape with that of the metal panel to be reinforced. Preferably, the reinforcing sheet has sufficient flexibility so as to conform to the shape of the metal panel upon its application to the metal panel without premolding.

In either case, in order for the reinforcing sheet to decrease vibration and corrosion of the metal panel and to provide enhanced strength and rigidity to the panel, it is necessary that the reinforcing sheet maintain good contact with the panel to be reinforced both before, during and after curing of the thermosetting adhesive layer.

U.S. Pat. No. 4,444,818 describes a reinforcing sheet containing a first thermosetting adhesive layer, a second thermosetting adhesive layer with a reinforcing material embedded therein, and a protective film covering the entire reinforcing sheet. This sheet is used to secure a flattened tubular material to the metal panel to be reinforced. Upon heating the sheet to cure the thermosetting adhesive layers, the flattened tubular material recovers its original tubular form to provide a wave-like or ribbed construction for the reinforcing sheet.

According to U.S. Pat. No. 4,444,818, the reinforcing material is embedded in the second thermosetting adhesive layer and provides increased reinforcing effect to the metal panel. Reinforcing materials include cloths of inorganic fibers, such as of glass or asbestos fabric; cloths of organic fibers, such as of flax, cotton, nylon, polyester or polypropylene fiber; plastic films such as of polyester or nylon film; paper such as kraft paper; nonwoven fabrics such as of polyester fiber or polypropylene fiber; and metal foils such as of aluminum, iron, copper or zinc foil.

U.S. Pat. No. 4,444,818 further describes the use of a protective film on the side of the reinforcing sheet opposite that of the metal panel to be reinforced. According to the patent, the protective film facilitates separation of the reinforcing sheet when stored in the form of a rolled tape, participates in the reinforcement of the metal panel to be reinforced, and improves the moisture resistant characteristics of the fabric reinforced resin layer. Various films, such as polyester, polyethylene, nylon, polyvinyl chloride, and polypropylene films, are described.

However, the use of conventional reinforcing adhesive sheets containing thermosetting resins for reinforcing a metal panel, including those adhesive sheets containing a protective film as described in U.S. Pat. No. 4,444,818, has drawbacks.

Thus, reinforcing adhesive sheets containing thermosetting resins have a tendency readily to absorb moisture, including moisture that is naturally present, for example in the atmosphere. The absorbed moisture adversely affects the thermosetting adhesive layer of the reinforcing sheet and, therefore, the adhesion of the reinforcing sheet to the metal panel upon curing of the thermosetting adhesive layer. Such adverse effects are particularly pronounced when the metal panel, with attached reinforcing sheet, is stored for a number of months, especially under humid conditions, before curing of the adhesive layer. It is believed that such adverse effects stem from decomposition of the curing agents in the thermosetting adhesive layer such that gas forms and is trapped in the thermosetting adhesive layer during curing. Due to the trapped gas, the adhesive layer is not as cohesive and the reinforcing sheet tends to fall from the metal panel.

Even the protective film described in U.S. Pat. No. 4,444,818 does not adequately prevent or solve the problems caused by the absorption of moisture by the reinforcing sheet before curing. One skilled in the art can readily appreciate that the thin polyester, polyethylene, nylon, polyvinyl chloride or polypropylene films described in U.S. Pat. No. 4,444,818 cannot maintain complete impermeability to atmospheric moisture over an extended period of time due to their relatively poor humidity barrier properties.

Moreover, the location of the protective film, presumably positioned to protect the entire reinforcing sheet including the expandable core, necessarily involves drawbacks. The location of the protective layer as the outside layer of the reinforcing sheet subjects the protective layer to wear and tear during handling and storage of the reinforcing sheet. In addition, the adverse consequences resulting from any damage to the protective layer, such as a worn spot, tear or hole, would be aggravated by its placement on top of the absorptive woven or nonwoven reinforcing material. Capillary action of the reinforcing material magnifies the amount of moisture absorbed by the thermosetting adhesive layer such that the area affected by any damage to the protective layer would be proportionately larger than the area of the damage itself. Furthermore, capillary action from the unprotected sides of the reinforcing material when the protective layer is placed on top of the absorptive reinforcing material is sufficiently strong adversely to affect the entire adhesive layer. As a result of the absorption of moisture by the adhesive layer, the reinforcing sheet would tend to fall from the metal panel during curing of the adhesive layer.

To replace the polyester protective layer of U.S. Pat. No. 4,444,818 with a material that has greater impermeability to moisture and greater resistance to damage, such as a metal film, would be expected to induce additional drawbacks. Such metal foil would necessarily be more inflexible than the polyester layer and would tend to buckle and separate from the underlying reinforcing material during handling and upon conforming the shape of the reinforcing sheet to the shape of the panel to be reinforced. Such buckling and separation of the metal protective layer from the underlying reinforcing material would create tunnels which would allow moisture to be even more readily absorbed by the reinforcing sheet.

It can thus be readily appreciated that provision of a reinforcing sheet which is resistant to moisture and the tendency to absorb atmospheric humidity and eliminates the previously discussed problems would be a highly desirable advance over the current state of panel reinforcement technology.

OBJECTS OF THE INVENTION

It is an object of this invention to provide a reinforcing sheet for the reinforcement of a panel formed of metal, plastic or sheet molding compound, which reinforcing sheet resists the tendency to absorb atmospheric humidity.

It is a second object of this invention to provide a reinforcing sheet which contains a moisture impermeable barrier positioned within the sheet such that the likelihood of damage to the barrier is greatly reduced, and such that the effect of any such damage is minimized.

It is an additional object of this invention to provide such a moisture resistant reinforcing sheet for the reinforcement of a panel, which sheet is sufficiently flexible to conform to the shape of the panel to be reinforced without risking contact with atmospheric moisture.

It is also an object of the invention to provide a reinforcing sheet which adheres to the panel before, during and after curing of the adhesive layer even after storage of the panel with applied uncured reinforcing sheet under humid conditions.

It is a further object of the invention to provide a method for reinforcing a panel formed of metal, plastic or sheet molding compound by using a reinforcing sheet which is resistant to the adverse effects of atmospheric humidity.

It is yet another object of the invention to provide a reinforced panel which exhibits improved resistance to corrosion and vibration compared to an unreinforced panel.

These and other objects and advantages of the present invention will become more readily apparent after consideration of the following.

STATEMENT OF THE INVENTION

In one aspect the present invention is directed to a reinforcing sheet for the reinforcement of a panel formed of metal, plastic or sheet molding compound, which reinforcing sheet comprises a moisture impermeable barrier embedded in a thermosetting adhesive layer and a reinforcement adhered to the surface of the thermosetting adhesive layer opposite the surface to be applied to the panel to be reinforced.

In a further aspect the present invention relates to a method for reinforcing a panel formed of metal, plastic or sheet molding compound, which method comprises applying to the panel a reinforcing sheet containing a moisture impermeable barrier embedded in a thermosetting adhesive layer and a reinforcement adhered to the surface of the thermosetting adhesive layer opposite the surface to be applied to the panel to be reinforced, and then heating the reinforcing sheet with the embedded moisture impermeable barrier to the curing temperature of the thermosetting adhesive to harden the reinforcing sheet.

BRIEF DESCRIPTION OF THE DRAWINGS

The present invention, as well as other objects and features thereof, will be understood more clearly and fully from the following description of certain preferred embodiments, when read with reference to the accompanying drawing, in which.

DESCRIPTION OF CERTAIN PREFERRED EMBODIMENTS

Figure 1:
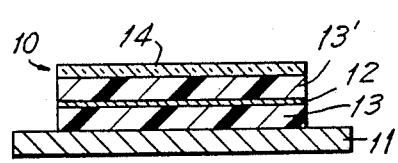
FIG. 1 is a front view, in vertical section, of a reinforcing sheet applied to a panel to be reinforced.

With reference now to FIG. 1, reinforcing sheet 10 for the reinforcement of panel 11, shown as formed of metal but which may also be plastic or sheet molding compound, includes moisture impermeable barrier 12 embedded within thermosetting adhesive layer 13, 13'.

In a preferred embodiment, thermosetting adhesive layer 13, 13' is formed of an epoxy resin and a curing agent. Advantageously, a mixture of cycloaliphatic epoxides, epoxidized novolac resins, epoxidized bisphenol A or bisphenol F resins, butanediol diglycidyl ether, neopentyl glycol diglycidyl ether or flexibilizing epoxy resins can be used. These resins can be reacted with carboxy terminated butadiene acrylonitrile to produce rubber modified epoxy resins. The diglycidyl ether of bisphenol A and the diglycidyl ether of bisphenol A reacted with carboxy terminated butadiene acrylonitrile to produce a crosslinkable resin with improved peel strength and impact resistance are preferably used as the epoxy resin. Advantageously, Lewis acids, substituted imidazoles or amine salts can be used as curing agents. Preferably, dicyandiamide is used as the curing agent.

Thermosetting adhesive layer 13, 13' can include a plasticizer for impact and thermal shock resistance improvement. Advantageously, benzoates, adipates and phthalates can be used as the plasticizer. A phthalate, for example dibutyl phthalate, is preferred.

In addition, this thermosetting adhesive layer can further contain a flame retardant, such as a halogenated epoxy, hydrated alumina or antimony oxide; a flow control agent, such as clay or fumed silica; or a filler, such as glass, phenolic or aluminum oxide bubbles, preferably glass bubbles. Such fillers further serve as a low density reinforcing agent. Other fillers such as talcs, carbonates, silicates and aluminum oxide powder can be used to modify impact, reinforcement and adhesion characteristics. Still other fillers such as ferrites can be used to impart magnetic properties to the adhesive sheet.

The thermosetting adhesive is advantageously formed of 100 parts by weight of epoxy resin, 3 to 15 parts by weight of curing agent, 0 to 30 parts by weight of plasticizer, 0 to 15 parts by weight of clay filler and 0 to 60 parts by weight of glass bubbles.

The thermosetting adhesive suitably cures at about 160° to 220° C. The thermosetting adhesive composition may also include a catalyst compatible with the curing agent for curing the composition at lower temperatures. An appropriate catalyst is a substituted urea catalyst, preferably phenyl dimethyl urea. With such a catalyst, the adhesive cures at about 120° to 180° C.

Reinforcement 14, suitably in the form of a layer, is adhered to the surface of thermosetting adhesive layer 13' opposite the surface of thermosetting adhesive layer 13 to be applied to panel 11 to be reinforced. Preferably, the reinforcement is a woven glass fabric. The woven glass fabric reinforcement provides increased strength for the reinforcing sheet.

Figure 2:
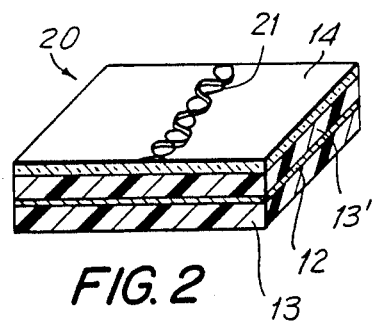
FIG. 2 is a perspective view of a reinforcing sheet.
Figure 3:
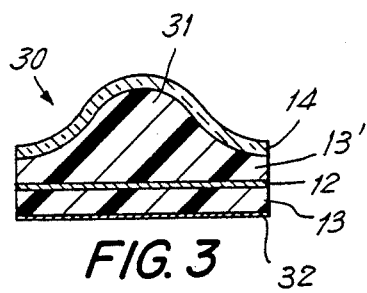
FIG. 3 is a front view, in vertical section, of a reinforcing sheet covered with release paper.
Figure 4:
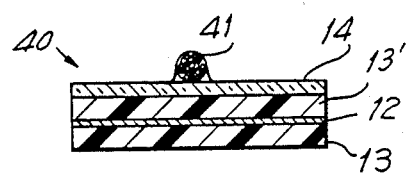
FIGS. 4 and 5 are front views, in vertical section, of two further embodiments of a reinforcing sheet.
Figure 5:
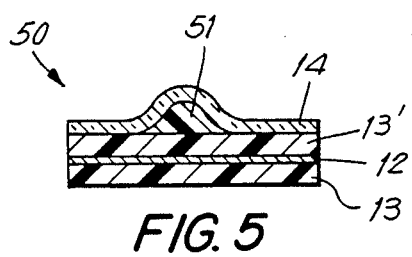

With reference now to FIGS. 1 through 5, the reinforcing sheet may take various forms while still maintaining the necessary flexibility to conform to the shape of the panel to be reinforced. The reinforcing sheet may be flat such as reinforcing sheet 10 in FIG. 1 and reinforcing sheet 20 in FIG. 2. As shown in FIG. 2, woven glass fabric 14 may have reinforcing constructions 21 woven into it, such as by weaving carbon fiber into the woven glass fabric or by changing the weave of the woven glass fabric. The reinforcing sheet may have a ribbed configuration such as reinforcing sheet 30 in FIG. 3, reinforcing sheet 40 in FIG. 4 and reinforcing sheet 50 in FIG. 5. As shown in FIG. 3, the rib may be formed of additional material 31 of the same composition as thermosetting adhesive layer 13' under the unexposed surface of woven glass fabric 14. As shown in FIG. 4, resin impregnated roving 41, such as a slightly twisted strand of textile fibers coated with resin, may be placed on the exposed surface of woven glass fabric 14 to form a rib. As shown in FIG. 5, the rib may be formed of flexible expandable material 51 which expands during curing to form a bead-like projection.

In accordance with the present invention, moisture impermeable barrier 12 is embedded between thermosetting adhesive layers 13 and 13'. Moisture impermeable barrier 12 acts to prevent moisture from adversely affecting protected thermosetting adhesive layer 13 after reinforcing sheet 10 is applied to panel 11 to be reinforced. For example, upon storage of panel 11 with applied adhesive reinforcing sheet 10, especially under humid conditions, moisture may be absorbed by woven glass fabric 14 and unprotected thermosetting adhesive layer 13'. However, migration of the moisture to protected thermosetting adhesive layer 13 is prevented by moisture impermeable barrier 12. In this manner, decomposition of the curing agents in protected thermosetting adhesive layer 13 and gassing of protected thermosetting adhesive layer 13 upon curing is prevented (except for possibly an inconsequential amount around the edges of the reinforcing sheet itself). Thus, the density of protected thermosetting adhesive layer 13 is not reduced by trapped gas. Accordingly, the corrosion and vibration resistance imparted by reinforcing sheet 10 to panel 11 is maintained. Moreover, good adhesion between reinforcing sheet 10 and panel 11 is likewise maintained to provide advantageous reinforcement and rigidity.

Any material that is moisture impermeable, remains stable up to the curing temperature, and exhibits sufficient adhesion to the thermosetting adhesive layer and sufficient flexibility to conform to the shape of the panel to be reinforced can be used as moisture impermeable barrier 12. A metal foil, such as aluminum, tin, copper, zinc, brass, steel or iron foil, can be advantageously used as moisture impermeable barrier 12. Because of its ready accessibility, inexpensive cost and high flexibility, aluminum foil is most preferred.

Moisture impermeable barrier 12, and in particular the aluminum foil used as the moisture impermeable barrier, must have sufficient thickness to maintain its integrity in order to prevent moisture from migrating to protected thermosetting adhesive layer 13. However, moisture impermeable barrier 12 must not have so great a thickness that its flexibility and capacity to conform to the shape of panel 11 to be reinforced are sacrificed. If aluminum foil is used as the moisture impermeable barrier, it suitably has a thickness of 0.0005 inch to 0.003 inch, more preferably 0.0008 inch to 0.002 inch, most preferably 0.001 inch.

Preferably, moisture impermeable barrier 12 is embedded approximately midway between the surface of the thermosetting adhesive layer 13 which comes in contact with panel 11 to be reinforced and the surface of thermosetting adhesive layer 13' which binds to reinforcement 14. Each of adhesive layers 13 and 13' has a thickness sufficient to bond the reinforcing sheet to the panel and to adhere the woven glass fabric reinforcement to the surface opposite the surface to be applied to the panel, respectively. Preferably, the combined adhesive layer has a thickness of 0.02 inch to 0.20 inch, preferably 0.03 inch to 0.10 inch, and at least 0.01 inch of the adhesive is provided on each side of the moisture impermeable barrier.

As shown in FIG. 3, the surface of protected thermosetting adhesive layer 13 away from moisture impermeable barrier 12 is advantageously covered with release sheet 32, preferably release paper, to facilitate handling of reinforcing sheet 30 and to prevent unintentional adhesion of the reinforcing sheet prior to its application to the panel to be reinforced. The release sheet can be removed just prior to applying the reinforcing sheet to the panel.

The reinforcing sheet advantageously is prepared by spreading a thermosetting adhesive layer onto release paper with a coating knife to a uniform thickness suitably of 0.01 inch to 0.10 inch, preferably 0.02 inch to 0.05 inch. The moisture impermeable barrier is then placed on the thermosetting adhesive layer and pressed with a pressure roll. A second thermosetting adhesive layer is pumped onto the moisture impermeable barrier and spread with a coating knife again to form a layer of uniform thickness suitably of 0.01 inch to 0.10 inch, preferably 0.02 inch to 0.05 inch. The reinforcement, such as the woven glass fabric, is adhered to the top of the second thermosetting adhesive layer, the surface of the adhesive layer opposite the surface to be applied to the panel to be reinforced. The woven glass fiber preferably has a thickness of 0.005 inch to 0.050 inch. The entire reinforcing sheet is then pressed with a roller to provide a sheet with total thickness suitably of 0.03 inch to 0.30 inch, preferably 0.04 inch to 0.10 inch.

To apply the reinforcing sheet to the panel to be reinforced, the release paper is removed from the reinforcing sheet and the reinforcing sheet is brought in contact with the panel. The reinforcing sheet has sufficient flexibility and thickness to conform to the shape of the panel to be reinforced. Because of the moisture impermeable barrier in the reinforcing sheet, the panel with the reinforcing sheet applied on it can be stored for long periods of time, for example three to six months, with minimal adverse effects due to the absorption of moisture, even under humid conditions.

Because the moisture impermeable barrier is embedded within the thermosetting adhesive layer, it is protected from damage during handling and storage of the reinforcing sheet. Furthermore, the position of the moisture impermeable barrier embedded within the uncured thermosetting adhesive layer serves to prevent buckling and separation of the barrier from the laminated reinforcing sheet, even when conforming the reinforcing sheet to the shape of the panel to be reinforced.

Whereas aluminum foil laminated to the woven glass reinforcement of the reinforcing sheet does not significantly improve the sheet's resistance to humidity absorption, a moisture impermeable barrier embedded within the thermosetting adhesive layer does provide resistance to humidity absorption. Moreover, the disadvantageous effects of any flaw in the moisture impermeable barrier which otherwise would allow aggravated damage to the thermosetting adhesive layer due to absorption of moisture if the barrier were located at the surface of the reinforcing sheet, particularly at the reinforcement adhered to the thermosetting adhesive layer, are minimized due to the location of the barrier embedded in the thermosetting adhesive layer.

A panel with a reinforcing sheet having an embedded moisture impermeable barrier applied to the panel can be heated to the curing temperature of the thermosetting adhesive layer, preferably to a temperature of 120° to 220° C., to harden the reinforcing sheet without adverse effects, even after storage for a number of months under humid conditions.

Further objects of this invention, together with additional features contributing thereto and advantages accruing therefrom, will be apparent from the following examples of the invention.

EXAMPLE 1

A flat reinforcing sheet containing a 0.001 inch aluminum foil moisture impermeable barrier was constructed according to the invention. The aluminum foil was embedded midway within a thermosetting adhesive layer formed of 30 parts by weight of the diglycidyl ether of bisphenol A, 70 parts by weight of the diglycidyl ether of bisphenol A reacted in a 3:2 ratio with carboxy terminated butadiene acrylonitrile, 7 parts by weight of a phthalate plasticizer, 6 parts by weight of dicyandiamide curing agent, 7 parts by weight of clay, 15 parts by weight of glass bubbles, and 1.5 parts by weight of phenyl dimethyl urea catalyst for dicyandiamide curing. The reinforcing sheet contained a woven glass fabric adhered to the surface of the thermosetting adhesive layer opposite the surface to be applied to the panel to be reinforced.

A comparative sample was prepared in an identical manner to the sample according to the invention except omitting the moisture impermeable barrier.

A 1 inch wide by 6 inch long piece of the reinforcing sheet according to the invention was applied to a first cold rolled steel metal panel of dimensions 1 inch wide by 6 inch long by 0.030 inch thick. Similarly, a 1 inch wide by 6 inch long sample of the comparison reinforcing sheet without the moisture impermeable barrier was applied to an identical second cold rolled steel metal panel of dimensions 1 inch wide by 6 inch long by 0.030 inch thick.

Both metal panels with uncured reinforcing sheet were stored at 100° F. and 100% relative humidity for 48 hours.

The two samples were then heated at 150° C. for 0.5 hour to cure and harden the thermosetting adhesive.

The following test results compare the flexural reinforcement properties of an unreinforced metal panel, the metal panel reinforced by the reinforcing sheet according to the invention and the metal panel reinforced by a reinforcing sheet without a moisture impermeable barrier, measured at 74° F. at a load rate of 0.2 inch per minute on a support span of 4 inch.

TABLE I

| Flexural Properties of Cold Rolled Steel Panel | | | |
|---|---|---|---|
| | Unreinforced | With Barrier | Without Barrier |
| Post cure thickness, inches | | 0.087 | 0.090 |
| Load at 0.1 in. deflection, lbs. | 7 | 41 | 43 |
| Ultimate load, lbs. | 11 | 69 | 72 |
| Ultimate deflection, in. | >0.5 | 0.20 | 0.23 |

Thus, the presence of the moisture impermeable barrier does not affect the reinforcement capability of the reinforcing sheet.

In addition, the adhesive layers of the two reinforcing adhesive sheets were visually compared. In the reinforcing sheet without the moisture impermeable barrier, the thermosetting adhesive layer was gassed through the entire sheet. Presumably, this gassing was caused by decomposition of the curing agent in the presence of moisture absorbed by the thermosetting adhesive layer. The trapped gas reduced the cohesiveness and density of the thermosetting adhesive layer during and after curing. Loss of cohesion of the adhesive layer resulted in the reinforcing sheet peeling away from the cold rolled steel during curing.

On the other hand, the reinforcing sheet according to the invention with the moisture impermeable barrier exhibited gassing of the thermosetting adhesive layer only between the aluminum foil and the woven glass fabric but no gassing of the thermosetting adhesive between the aluminum foil and the cold rolled steel metal panel. Thus, the thermosetting adhesive layer in contact with the steel panel maintained its integrity, including its adhesion to the metal panel, despite the fact that the reinforcing sheet was subjected to moisture from atmospheric humidity. The reinforcing sheet containing the moisture impermeable barrier remained adhered to the metal panel during curing. The corrosion and vibration protection of the reinforced metal panel was maintained.

EXAMPLE 2

A flat reinforcing sheet having a 0.001 inch aluminum foil moisture impermeable barrier was constructed according to the invention. The aluminum foil was embedded midway within a thermosetting adhesive layer formed of 30 parts by weight of the diglycidyl ether of bisphenol A, 70 parts by weight of the diglycidyl ether of bisphenol A reacted in a 3:2 ratio with carboxy terminated butadiene acrylonitrile, 7 parts by weight of a phthalate plasticizer, 6 parts by weight of dicyandiamide curing agent, 7 parts by weight of clay, and 20 parts by weight of glass bubbles. The reinforcing sheet contained a woven glass fabric adhered to the surface of the thermosetting adhesive layer opposite the surface to be applied to the panel to be reinforced.

A comparative sample was prepared in an identical manner to the sample according to the invention except omitting the moisture impermeable barrier.

A 1 inch wide by 6 inch long piece of the reinforcing sheet according to the invention was applied to a first cold rolled steel metal panel of dimensions 1 inch wide by 6 inch long by 0.030 inch thick. Similarly, a 1 inch wide by 6 inch long sample of the comparison reinforcing sheet without the moisture impermeable barrier was applied to an identical second cold rolled steel metal panel of dimensions 1 inch wide by 6 inch long by 0.030 inch thick.

Both metal panels with uncured reinforcing sheet were stored at 100° F. and 100% relative humidity for 48 hours.

The two samples were then heated at 200° C. for 0.5 hour to cure and harden the thermosetting adhesive.

The following test results compare the flexural reinforcement properties of an unreinforced metal panel, the metal panel reinforced by the reinforcing sheet according to the invention and the metal panel reinforced by a reinforcing sheet without a moisture impermeable barrier, measured at 74° F. at a load rate of 0.2 inch per minute on a support span of 4 inch.

TABLE II

| Flexural Properties of Cold Rolled Steel Panel | | | |
| --- | --- | --- | --- |
| | Unreinforced | With Barrier | Without Barrier |
| Post cure thickness, inches | | 0.090 | 0.081 |
| Load at 0.1 in. deflection, lbs. | 7 | 39 | 32 |
| Ultimate load, lbs. | 11 | 70 | 64 |
| Ultimate deflection, in. | >0.5 | 0.24 | 0.31 |

Thus, the presence of the moisture impermeable barrier does not affect the reinforcement capability of the reinforcing sheet.

In addition, the adhesive layers of the two reinforcing adhesive sheets were visually compared. In the reinforcing sheet without the moisture impermeable barrier, the thermosetting adhesive layer was gassed through the entire sheet. Presumably, this gassing was caused by decomposition of the curing agent in the presence of moisture absorbed by the thermosetting adhesive layer. The trapped gas reduced the cohesiveness and density of the thermosetting adhesive layer during and after curing. Loss of cohesion of the adhesive layer resulted in the reinforcing sheet peeling away from the cold rolled steel during curing.

On the other hand, the reinforcing sheet according to the invention with the moisture impermeable barrier exhibited gassing of the thermosetting adhesive layer only between the aluminum foil and the woven glass fabric but no gassing of the thermosetting adhesive between the aluminum foil and the cold rolled steel metal panel. Thus, the thermosetting adhesive layer in contact with the steel panel maintained its integrity, including its adhesion to the metal panel, despite the fact that the reinforcing sheet was subjected to moisture from atmospheric humidity. The reinforcing sheet containing the moisture impermeable barrier remained adhered to the metal panel during curing. The corrosion and vibration protection of the reinforced metal panel was maintained.

What is claimed is:

1. A reinforcing sheet adaptable to the reinforcement of a panel formed of metal, plastic or sheet molding compound, which reinforcing sheet comprises:
    a thermosetting adhesive layer having a first and a second surface, the first surface being in contact with the panel when applied to the panel to be reinforced;
    a moisture impermeable barrier embedded in the thermosetting adhesive layer to prevent moisture from adversely affecting the cohesion of the thermosetting adhesive layer between the panel and the moisture impermeable barrier upon curing the thermosetting adhesive layer when applied to the panel to be reinforced, said moisture impermeable barrier being adhered to the thermosetting adhesive and being stable up to the curing temperature of the thermosetting adhesive; and
    a reinforcement adhered to the second surface of the thermosetting adhesive layer opposite the first surface to be applied to the panel to be reinforced.

2. A reinforcing sheet as in claim 1 wherein the moisture impermeable barrier is a metal foil.

3. A reinforcing sheet as in claim 2 wherein the metal is selected from the group consisting of aluminum, tin, copper, zinc, brass, steel and iron.

4. A reinforcing sheet as in claim 2 wherein the metal is aluminum.

5. A reinforcing sheet as in claim 1 wherein the reinforcement is a woven glass fabric.

6. A reinforcing sheet as in claim 1 wherein the thermosetting adhesive layer comprises an epoxy resin and a curing agent.

7. A reinforcing sheet as in claim 6 wherein the thermosetting adhesive layer further comprises a plasticizer.

8. A reinforcing sheet as in claim 7 wherein the thermosetting adhesive layer further comprises a flow control agent and a filler.

9. A reinforcing sheet as in claim 6 wherein the thermosetting adhesive layer further comprises a catalyst for curing the thermosetting adhesive layer.

10. A reinforcing sheet as in claim 4 wherein the aluminum foil has a thickness of 0.0005 inch to 0.003 inch.

11. A reinforcing sheet as in claim 3 wherein the aluminum foil has a thickness of 0.0008 inch to 0.002 inch.

12. A reinforcing sheet as in claim 1 wherein the adhesive layer has a thickness of 0.03 inch to 0.10 inch.

13. A reinforcing sheet as in claim 4 wherein the woven glass fabric has a thickness of 0.005 inch to 0.050 inch.

14. A reinforcing sheet as in claim 1 further comprising a release paper laminated on the thermosetting adhesive layer on the surface of the adhesive layer to be applied to the panel to be reinforced.

15. A reinforcing sheet as in claim 6 wherein the thermosetting adhesive layer cures at a temperature of 160° to 220° C.

16. A reinforcing sheet as in claim 9 wherein the thermosetting adhesive layer cures at a temperature of 120° to 180° C.

17. A method for reinforcing a panel formed of metal, plastic or sheet molding compound, which method comprises:
    applying to the panel a reinforcing sheet containing a moisture impermeable barrier embedded in a thermosetting adhesive and a reinforcement adhered to the surface of the thermosetting adhesive opposite the surface to be applied to the panel to be reinforced; and then
    heating the reinforcing sheet to the curing temperature of the thermosetting adhesive to harden the reinforcing sheet.

18. A reinforcing sheet adaptable to the reinforcement of a panel formed of metal, plastic or sheet molding compound, which reinforcing sheet comprises:
    a moisture impermeable barrier embedded in a thermosetting adhesive layer to maintain the integrity of the thermosetting adhesive layer in contact with the panel when applied to the panel to be reinforced, said moisture impermeable barrier being adhered to the thermosetting adhesive and being stable up to the curing temperature of the thermosetting adhesive; and
    a reinforcement adhered to the surface of the thermosetting adhesive layer opposite the surface to be applied to the panel to be reinforced.

19. A reinforced panel formed of metal, plastic or sheet molding compound, which reinforced panel comprises;
    a thermosetting adhesive layer having a first and a second surface, the first surface being in contact with the panel to be reinforced;
    a moisture impermeable barrier embedded in the thermosetting adhesive layer to prevent moisture from adversely affecting the cohesion of the thermosetting adhesive layer between the panel and the moisture impermeable barrier upon curing the thermosetting adhesive layer applied to the panel to be reinforced, said moisture impermeable barrier being adhered to the thermosetting adhesive and being stable up to the curing temperature of the thermosetting adhesive; and
    a reinforcement adhered to the second surface of the thermosetting adhesive layer opposite the first surface applied to the panel to be reinforced.

* * * * *